(12) United States Patent
Li et al.

(10) Patent No.: US 6,980,511 B1
(45) Date of Patent: Dec. 27, 2005

(54) METHOD OF ACTIVE DYNAMIC RESOURCE ASSIGNMENT IN A TELECOMMUNICATIONS NETWORK

(75) Inventors: Na Li, Austin, TX (US); San-qi Li, Plano, TX (US); Cathy A. Fulton, Austin, TX (US)

(73) Assignee: Santera Systems Inc., Plano, TX (US)

( * ) Notice: Subject to any disclaimer, the term of this patent is extended or adjusted under 35 U.S.C. 154(b) by 834 days.

(21) Appl. No.: 09/626,400

(22) Filed: Jul. 26, 2000

(51) Int. Cl.[7] .............................. H04J 1/16; H04J 3/16; H04L 12/28
(52) U.S. Cl. ................. 370/230; 370/235; 370/395.21; 370/395.42; 370/468
(58) Field of Search ............................. 455/450, 451, 455/452.1, 452.2, 453, 455, 456.1, 456.3, 455/464, 509, 67.3, 343.3, 54.2, 435.1; 370/468, 370/477, 464, 472, 475, 235, 236, 230, 232, 370/412, 395.21, 395.41, 395.42, 395.43, 370/437; 330/289, 277; 709/226, 224, 229, 709/241, 223

(56) References Cited

U.S. PATENT DOCUMENTS

| | | | | |
|---|---|---|---|---|
| 5,130,982 | A | * | 7/1992 | Ash et al. .................... 370/352 |
| 5,956,342 | A | * | 9/1999 | Manning et al. ............. 370/414 |
| 5,996,019 | A | * | 11/1999 | Hauser et al. ............... 709/235 |
| 6,014,367 | A | * | 1/2000 | Joffe ........................... 370/230 |
| 6,046,981 | A | * | 4/2000 | Ramamurthy et al. ....... 370/232 |
| 6,408,005 | B1 | * | 6/2002 | Fan et al. .................... 370/412 |
| 6,438,135 | B1 | * | 8/2002 | Tzeng ......................... 370/412 |
| 6,442,138 | B1 | * | 8/2002 | Yin et al. .................... 370/232 |
| 6,452,933 | B1 | * | 9/2002 | Duffield et al. ............. 370/415 |
| 6,469,982 | B1 | * | 10/2002 | Henrion et al. ............. 370/230 |

(Continued)

FOREIGN PATENT DOCUMENTS

| | | |
|---|---|---|
| EP | 0522391 A2 | 1/1993 |
| EP | 0859492 A2 | 8/1998 |
| EP | 0901301 A2 | 3/1999 |

OTHER PUBLICATIONS

Shimokoshi, K., "Performance comparison of bandwidth allocation mechanisms for LAN/MAN interworking through an ATM network", IEEE 1994, pp. 1405-1411.

Hans Kroner, et al., "Management von ATM-Netzen", Informationstechnik und Technische Informatik No. 39, Jan. 1997, pp. 5-14.

Bennett, Jon C.R., et al., "Hierarchical Packet Fair Queueing Algorithms," Computer Communication Review, Jul. 9, 1996, 14 pages, cited World Wide Web http://www.acm.org/sigcomm/ccr/archive/1996/conf/bennett.pdf.

*Primary Examiner*—Seema S. Rao
*Assistant Examiner*—Melanie Jagannathan
(74) *Attorney, Agent, or Firm*—Haynes and Boone, LLP

(57) ABSTRACT

A method of adaptive resource allocation in transmitting data is provided. In particular, the method of the present invention is applicable to scheduling bandwidths using a modified and dynamic weighted round robin process. The method includes the steps of allocating a resource to each of a plurality of data transmitting active connections, the plurality of active connections belonging to more than one class of service. Then the method determines a lender class of service for each active connection from which resources may be reallocated to the active connection, and periodically comparing the resource usage of an active connection to an upper threshold and a lower threshold. Borrowing action for resources from the lender class of service for the active connection is carried out in response to the current usage exceeding the upper threshold, and returning action for borrowed resources to the lender class of service from the active connection in response to the current usage being less than the lower threshold is carried out.

26 Claims, 7 Drawing Sheets

U.S. PATENT DOCUMENTS

| | | | |
|---|---|---|---|
| 6,477,167 B1 * | 11/2002 | Wu | 370/395.21 |
| 6,526,060 B1 * | 2/2003 | Hughes et al. | 370/395.4 |
| 6,577,621 B1 * | 6/2003 | Balachandran | 370/352 |
| 6,683,884 B1 * | 1/2004 | Howard | 370/412 |
| 6,771,595 B1 * | 8/2004 | Gilbert et al. | 370/229 |
| 6,775,231 B1 * | 8/2004 | Baker et al. | 370/230.1 |
| 6,816,456 B1 * | 11/2004 | Tse-Au | 370/230.1 |
| 2001/0038640 A1 * | 11/2001 | McKinnon et al. | 370/468 |

* cited by examiner

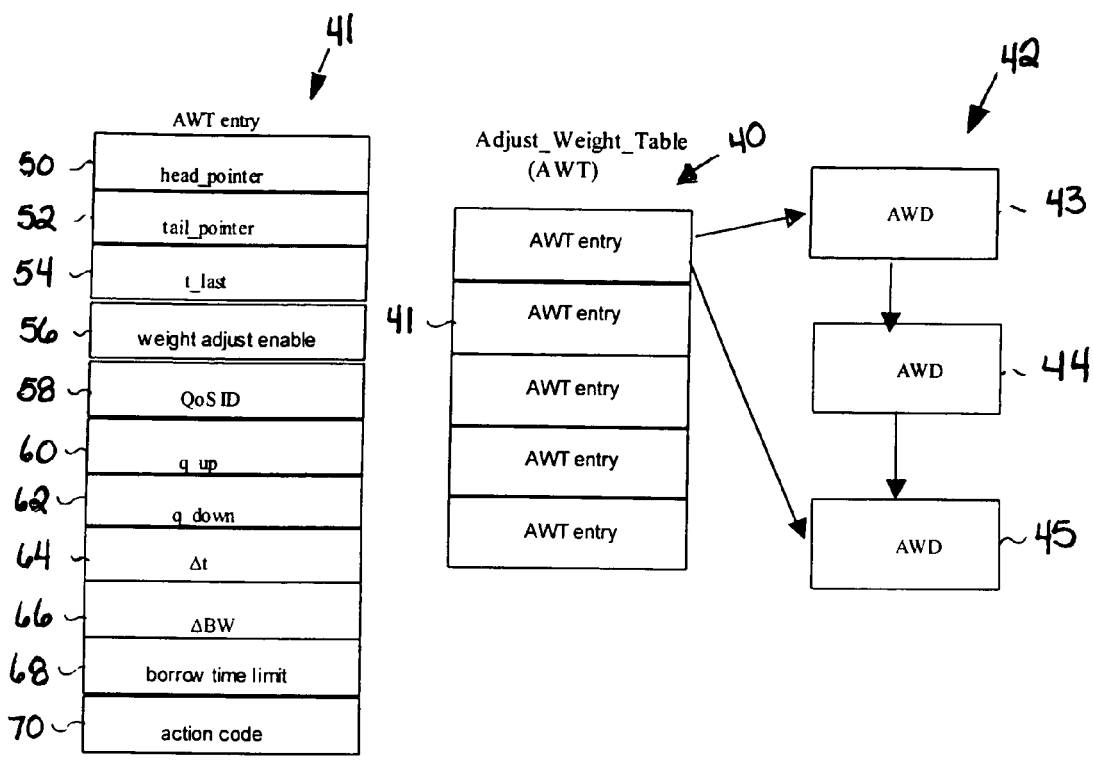
*FIG. 3B*
*FIG. 3A*
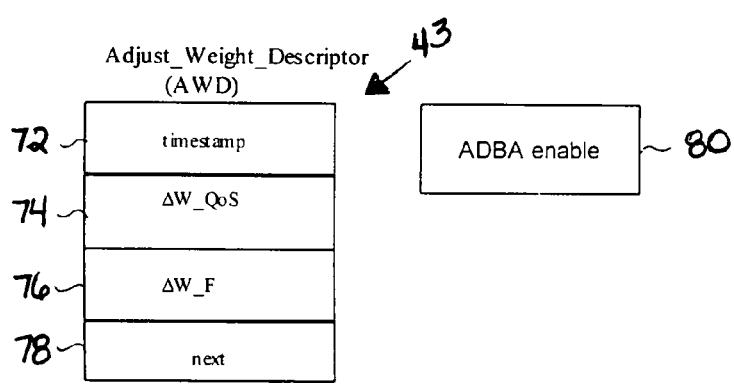
*FIG. 3C*

METHOD OF ACTIVE DYNAMIC RESOURCE ASSIGNMENT IN A TELECOMMUNICATIONS NETWORK

BACKGROUND OF THE INVENTION

When a new connection is to be set up by a switch in a telecommunications network, the switch has to assign certain resources, i.e., buffer to hold the incoming cells and bandwidth to transmit cells, according to the specified Quality of Service (QoS) requirement and the connection parameters. QoS can be specified in terms of the amount of delay and/or cell loss ratio. The connection parameters include average sending rate, peak sending rate, and maximum back-to-back cell number (maximum burst size). Initially, the resource assignment is static and remains unchanged during the lifetime of the connection. Therefore, if more resources become available, a static resource connection assignment cannot make use of the additional available resources to achieve better performance.

In some conventional switches, dynamic adjustment of the buffer (memory) allocation for connections based on the overall queue occupancy is performed. When most connections are active, and the total buffer occupancy is high, the per connection buffer allocation is low. When the total buffer occupancy is low, the per connection buffer assignment is high, permitting active connections using more buffer to achieve lower cell loss rate.

The same requirement is true for bandwidth assignment. There are three conventional scheduling methods, namely strict priority, rate scheduling, and weighted round robin. Strict priority scheduling is the simplest method. Strict priority scheduling always gives connections in one class higher priority than connections in another class. For example, whenever any connection in class A has cells to transmit, cells of connections in class B are not sent. Strict priority is risky since there is no control over how much of the class B connections will be made. Therefore, it is difficult to support more than two classes of service. Furthermore, service guarantee can only be made for the highest priority class, and not to the others. Strict priority also cannot be used for scheduling allocation within one class.

The rate scheduling method uses a timed ring to make the cell-to-cell spacing of a connection equal to a predefined value, which is the inverse of the connection's assigned bandwidth. When the assigned bandwidth is static, the cells associated with the connection cannot be sent faster than the assigned bandwidth.

Weighted round robin (WRR) is another conventional scheduling method. It uses the weight assigned to a connection to make the scheduling decision. The actual bandwidth allocated to a connection is proportional to its own weight and inversely proportional to the total weight of all active connections. Therefore, when other connections are not using their bandwidths, i.e. they have no cells to transmit, a connection can automatically get more bandwidth. WRR scheduling can provide a connection with the assigned bandwidth and make a full use of the available bandwidth as long as the switch bounds the total weight of active connections by rejecting some connections. For example, if there are a total of ten connections and each with the weight of 2. If all connections are active, a connection is allocated 1/10 link bandwidth. If only five connections are active, then an active connection is now allocated 1/5 link bandwidth. However, this method uses static weight assignment, which only occurs at connection setup. Given a bounded total weight, the weight assigned to a connection with a delay guarantee has to be large enough to make sure that the connection obtains sufficient bandwidth without violating the QoS service contract. If the weight assignment is conservative and based on the largest possible sending rate, the switch can obey the service contract but only support a very limited number of connections that require strict QoS guarantee. On the other hand, if the weight is assigned based on the average sending rate, it is possible that the cells experience large delay and are useless to the receiver. Internet service providers (ISPs) prefer to assign minimum weight to a connection in order to support more connections for higher profit and still adhere to the service contract. WRR with static weight assignment cannot fulfill these goals.

SUMMARY OF THE INVENTION

In accordance with the present invention, a dynamic adaptive resource allocation method is provided which overcomes problems associated prior methods. During the life of a connection, the weight assignment of the connection is adaptively adjusted according to its dynamic bandwidth or rate requirement. The bandwidth or rate is borrowed from a lender class of services, not from a specific connection, and is returned within a maximum borrow time or when it is no longer needed. Therefore, delay-critical connections starved for bandwidth can borrow resources to adhere to its QoS requirement and return it when the borrowed resource is no longer needed.

In one embodiment of the present invention, a method of adaptive resource allocation in transmitting data is provided. In particular, the method of the present invention is applicable to scheduling bandwidths using a modified and dynamic weighted round robin process. The method includes the steps of allocating a resource to each of a plurality of data transmitting active connections, the plurality of active connections belonging to more than one class of service. Then the method determines a lender class of service for each active connection from which resources may be reallocated to the active connection, and periodically comparing the resource usage of an active connection to an upper threshold and a lower threshold. Borrowing action for resources from the lender class of service for the active connection is carried out in response to the current usage exceeding the upper threshold, and returning action for borrowed resources to the lender class of service from the active connection in response to the current usage being less than the lower threshold is carried out.

In another embodiment of the present invention, a telecommunications equipment having limited resources to allocate to active connections for a plurality of classes of services, using a method of dynamic resource allocation, includes a first data structure storing resource allocation weighting data associated with each class of services, and a second data structure storing resource allocation weighting data associated with each active connection in each class of services. The second data structure includes a class identifier specifying a lender class of services from which resource may be borrowed, an upper threshold indicative of when resource borrowing action for this active connection should be initiated, a lower threshold indicative of when resource returning action for this active connection should be initiated, and a sequence of data associated with each resource borrowing action of resources that have not been returned.

In yet another embodiment of the present invention, a method of adaptive dynamic weight assignment for transmitting data includes the steps of assigning a total weight to each class of services, assigning a weight to each of a plurality of data transmitting active connections in each class of services, and determining a lender class of service for each active connection from which weighting may be reallocated to the active connection. The method periodically compares the resource usage of an active connection to an upper threshold and a lower threshold, and borrows additional weighting from the lender class of service for the active connection in response to the current usage exceeding the upper threshold. The borrowed weighting is returned to the lender class of service from the active connection in response to the current usage being less than the lower threshold.

BRIEF DESCRIPTION OF THE DRAWINGS

For a more complete understanding of the present invention, the objects and advantages thereof, reference is now made to the following descriptions taken in connection with the accompanying drawings in which:

FIGS. 3A, 3B and 3C are a block diagrams of an embodiment of data structures used to store adjusted weight data according to the teachings of the present invention;

DETAILED DESCRIPTION OF THE DRAWINGS

The preferred embodiment of the present invention and its advantages are best understood by referring to FIGS. 1 through 8 of the drawings, where like numerals are used to refer to like and corresponding parts of the various drawings. To facilitate the understanding of the following description, acronyms and variable names are listed below for ease of reference:

| | |
|---|---|
| ΔBW | amount of bandwidth the connection can borrow each time |
| Δt | minimum time requirement between borrow and/or return actions |
| ΔW_F | the weight increment for the connection |
| ΔW_QoS | the reduced weight amount of the lender class of services |
| AWD | adjust weight descriptor |
| AWT | adjust weight table |
| Borrow_time_limit | maximum time to return borrow bandwidth |
| BW | bandwidth assigned to a scheduler |
| CONN ID | connection identifier |
| FTP | file transfer protocol |
| ISP | Internet service provider |
| q | buffer occupancy of a connection |
| q_down | buffer lower threshold |
| q_up | buffer upper threshold |
| QoS | quality of service |
| QoS_ID | class identifier that a connection can borrow bandwidth from |
| t_last | the last time a borrow or return action took place for the connection |
| timestamp | time of borrow action stored in adjust weight descriptor |
| W | total weight of all QoS classes |
| W_conn | weight of a connection stored in the Conn data structure |
| W_QoS | weight of a class associated with a connection stored in the QoS data structure |
| W_QoS_b | weight of the class associated with the current connection borrowing bandwidth |
| W_QoS_F | total weight of connections belonging to a class of connections |
| W_QoS_1 | weight of the class of service to lend bandwidth |
| WRR | weighted round robin |

Figure 1:
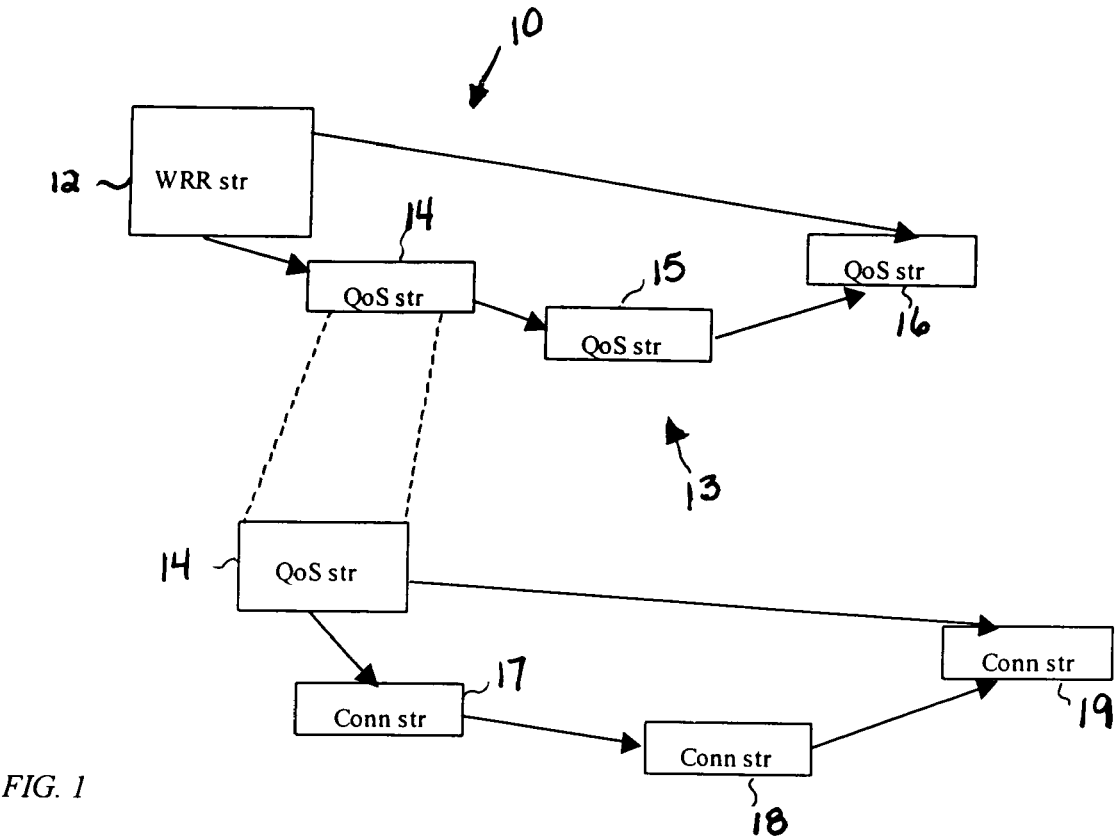
FIG. 1 is a block diagram of a weighted round robin scheduling data structure.

FIG. 1 is a simplified block diagram of a weighted round robin (WRR) scheduling data structure 10. WRR structure (WRR str) 12 is a data structure that stores the parameters associated to a particular WRR scheduler. WRR str 12 maintains a linked list 13 of the QoS classes data structure (QoS str) 14–16 and possibly the total weight of all QoS classes that belong to this scheduler. Each QoS class has its own weight, and maintains its own linked list of connection data structure, Conn str 17–19. QoS str 14 keeps such information, e.g., the head and tail pointer of the link list of connections in this class, also possibly the total weight of such connections. Each connection has its own weight as well, which is stored in Conn str 17–19. Only active connections are linked in the scheduler, therefore the bandwidth is only shared among active connections.

In WRR, the bandwidth of a flow j can be expressed as:

$$BW_{conn\_j}=(W_{conn\_j}/\text{sum}(W_{conn\_j}))*(W_{QoS\_m}/\text{sum}(W_{Qos\_n}))*BW,$$

Where BW is the bandwidth assigned to the WRR scheduler; $W_{conn\_j}$ is the jth connection's weight; and $W_{QoS\_m}$ is the weight of QoS class m, assuming connection j is in class m. When the weight of a connection is increased, its bandwidth is increased accordingly.

Figure 2:
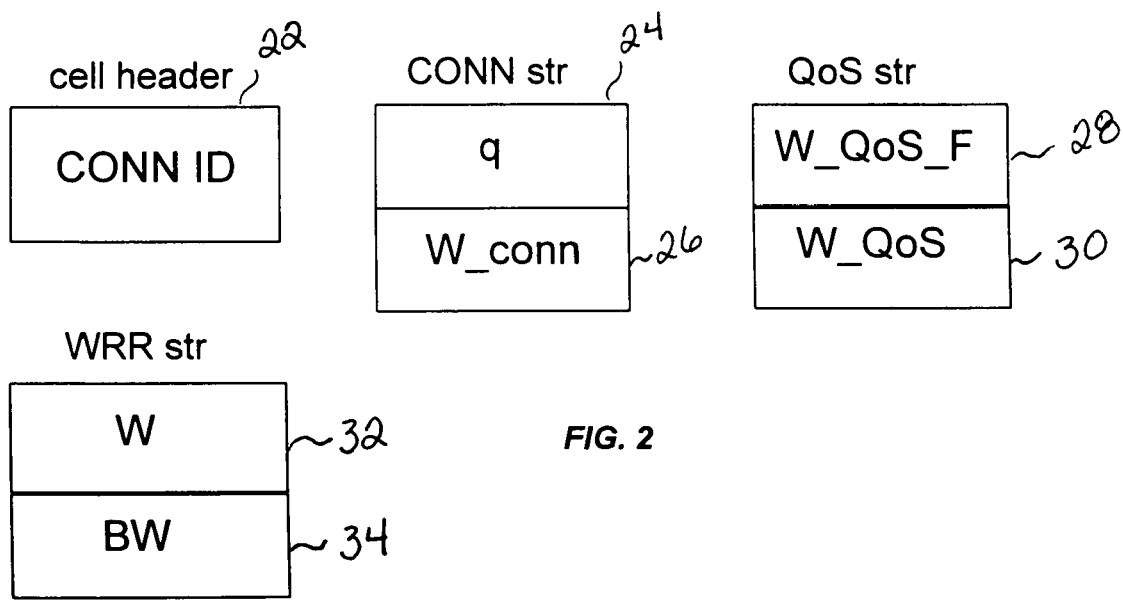
FIG. 2 is a block diagram of WRR information data structure.

FIG. 2 is a block diagram of various data fields involved in the methodology. The incoming cell header data structure 10 includes a connection identifier (CONN ID) 22. Conn str includes a buffer occupancy q 24 of a connection, and a weighting for the connection W_conn 26. W_QoS_F field 28 is the total weight of connections belonging to a class, and W_QoS 30 is the weight for a class, both stored in the QoS structure. W 32 is the total weight of all classes and BW 34 is the allocated bandwidth stored in a WRR structure 12. CONN ID 22, q 24, W_conn 26, and W_QoS 30 are conventional data fields for standard switches that support per connection QoS. W_QoS_F 28 and W 32 are available in some switches, but not in others. In conventional switches, BW 34 is a fixed value at scheduler initialization.

FIGS. 3A, 3B and 3C are block diagrams of an embodiment of data structures used to store adjusted weight data according to the teachings of the present invention. An Adjust_Weight_Table (AWT) 40 includes multiple AWT entries 41, with each AWT entry 41 pointing to or containing the address of the head 43 and tail 45 of a linked list 42 of Adjust_Weight_Descriptors (AWD) 43–45. Each AWT entry 41 corresponds to an established connection. CONN ID 22 in cell header 20 is used to index or address the AWT entry 41. AWD 43 is a data structure that stores the predefined parameters and dynamic variables for the connections. AWD records the information of each bandwidth borrowing action. A connection can borrow bandwidth for several times before returning any bandwidth.

In an AWT entry 41, a head_pointer 50 points to the address of the AWD that is at the head 43 of link list 42, and tail_pointer 52 points to the address of the AWD 45 that is at the tail of link list 42. t_last 54 is a data field that records the timestamp of the latest update action. The update action can be borrowing or returning bandwidth. These three variables 50–54 are dynamically updated. Weight_adjust_enable 56 indicates if this connection has authorization to borrow bandwidth from other connections. Weight_adjust_enable 56 is initialized during connection setup. If this flag is set, the following fields should be initialized as well. Qos_ID 58 is the class identifier that this connection can borrow bandwidth from. q_up 60 is the buffer threshold used to determine if the connection should borrow bandwidth. q_down 62 is the buffer threshold used to determine if the connection should return borrowed bandwidth. $\Delta t$ 64 is the time threshold used to limit how often the update action can occur. $\Delta BW$ 66 is the amount of bandwidth this connection can borrow each time. Borrow_time_limit 68 may be an optional field which defines how long the connection can borrow bandwidth and keep it before returning it. This check is important since it is possible that the source of the borrowing connection sends more data than permitted in the contract or that the bandwidth initially allocation to the connection is not reasonable. If the source sends too much data, the User Parameter Control (UPC) at the switch entrance of the connection can be configured to discard excess cells to prevent a conenction from maliciously benefiting from this invention when resource is stringent, and let the cells pass when resource is free. If the resource allocation is not reasonable, this problem can be identified before the connection suffers and experiences performance degradation. Action code 70 defines what action to take during abnormal state. In this example, the abnormal state can be defined as when a connection borrows bandwidth longer than the Borrow_time_limit. The abnormal state can be defined in other ways.

In AWD 43–45, timestamp 72 records the time when a borrow action occurs. $\Delta W\_QoS$ 74 is the reduced weight amount of the borrowed class. $\Delta W\_F$ 76 is the increased weight amount of this connection. A next field 78 points to the next AWD in link list 42. Whenever an eligible connection needs to borrow bandwidth from a class, memory is dynamically created and allocated to hold a new AWD. Proper values are filled into this new AWL, which is then linked into the tail 45 of linked list 42. The detailed procedure is described below. When the connection needs to return the borrowed bandwidth, the information of the AWD at the head of link list 42 is read for weight updates. The head AWD 43 is then removed from linked list 42, and the associated memory is released using standard procedures.

The switch (not shown) also uses a flag, ADBA (adaptive dynamic bandwidth assignment) enable 80, to indicate if the present invention is enabled or disabled. This parameter is set when the switch is initialized, and can be modified dynamically by the administrator.

Figure 4:
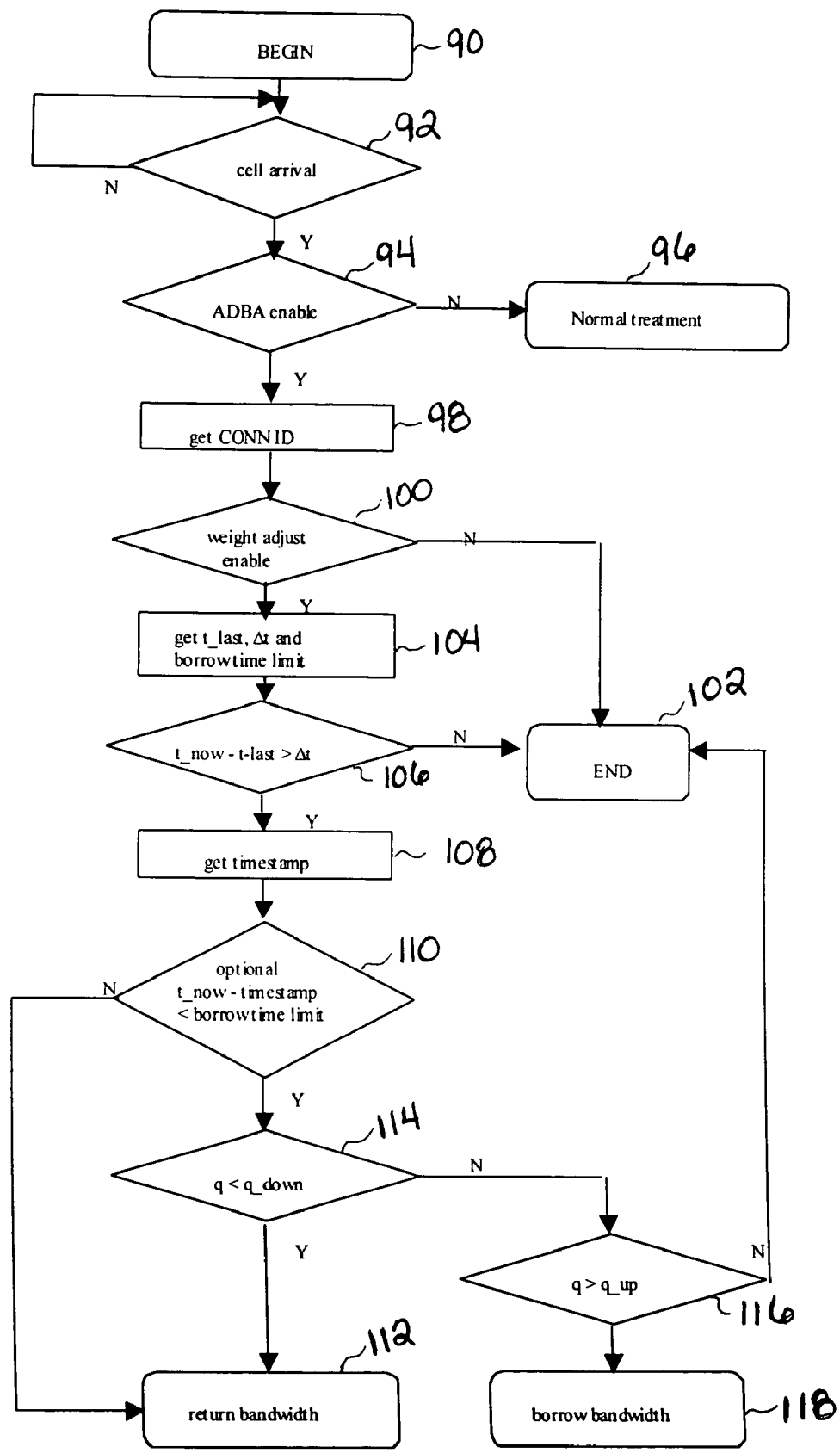
FIG. 4 is a flowchart of an embodiment of a method of adjusting a connection weighting according to the teachings of the present invention.

FIG. 4 is a flowchart of an embodiment of a method of dynamic connection weight adjustment 90 according to the teachings of the present invention. In this example, a determination of a predetermined event—a cell arrival—is made, as shown in block 92. Alternatively, periodic determination of whether connection weights should be adjusted can be initiated. At a cell arrival, a decision is made whether to adjust the weights. If adjustment is not permitted, as determined by the value of ADBA enable flag 80 in block 94, normal procedure or treatment is followed. If ADBA enable 80 is set, the connection ID (CONN ID) 22 of the incoming cell is read from memory, as shown in block. 98. Using CONN ID 22, the value of weight_adjust_enable 56 is accessed from AWT entry 41, as shown in block 100. If weight_adjust_enable flag 56 is not set, execution stops in block 102. Otherwise, t_last 54 (the latest borrow action time), $\Delta t$ 64 (the shortest time allowable between borrow actions), and borrow_time_limit 68 (how soon borrowed bandwidth needs to be returned) are read from AWT entry 41, as shown in block 104. If the current time, t_now, minuses t_last 54 is smaller than $\Delta t$, as determined in block 106, then the process ends. Therefore, update action can only occur at most once in each $\Delta t$ time interval. If this threshold is satisfied, timestamp 72 of AWD 43 at the head of linked list 42 of the connection maintained in AWT entry 41 is obtained, as shown in block 108. If the current time minus timestamp 72 is larger than borrow_time_limit 68, as determined in block 110, the connection is requested to return some borrowed bandwidth by assuming the action code is returning the bandwidth 112. Return bandwidth process 112 is described in more detail in FIG. 6. Other actions can also be defined and initiated. Otherwise, the current buffer occupancy of the connection q 24 is read from the switch memory and compared with q_down 62 from AWT entry 41 in block 114. If q<q_down, the connection returns the bandwidth. Otherwise, if q>q_up, as determined in block 116, the connection borrows bandwidth 118, which is described in more detail in FIG. 5. If q is not greater than q_up, execution stops.

The value of q_up 60 depends on the delay requirement of the connection and the average bandwidth allocated to the connection. The customer delay requirement is end-to-end. The delay consists of propagation delay, processing delay, and queuing delay. The propagation delay and processing delay are first subtracted from the delay parameter since they are fixed value. Next, the end-to-end value is broken into local values, i.e., each switch along the connection path is assigned its local queuing delay. The multiplication of the (local queuing delay—$\Delta t$) and the average bandwidth allocated to the connection gives a reasonable value for q_up. More delicate tuning is possible. When q_down is smaller than q_up, it allows hysteresis for oscillation avoidance. A reasonable value for q_down is half of the q_up.

Figure 5:
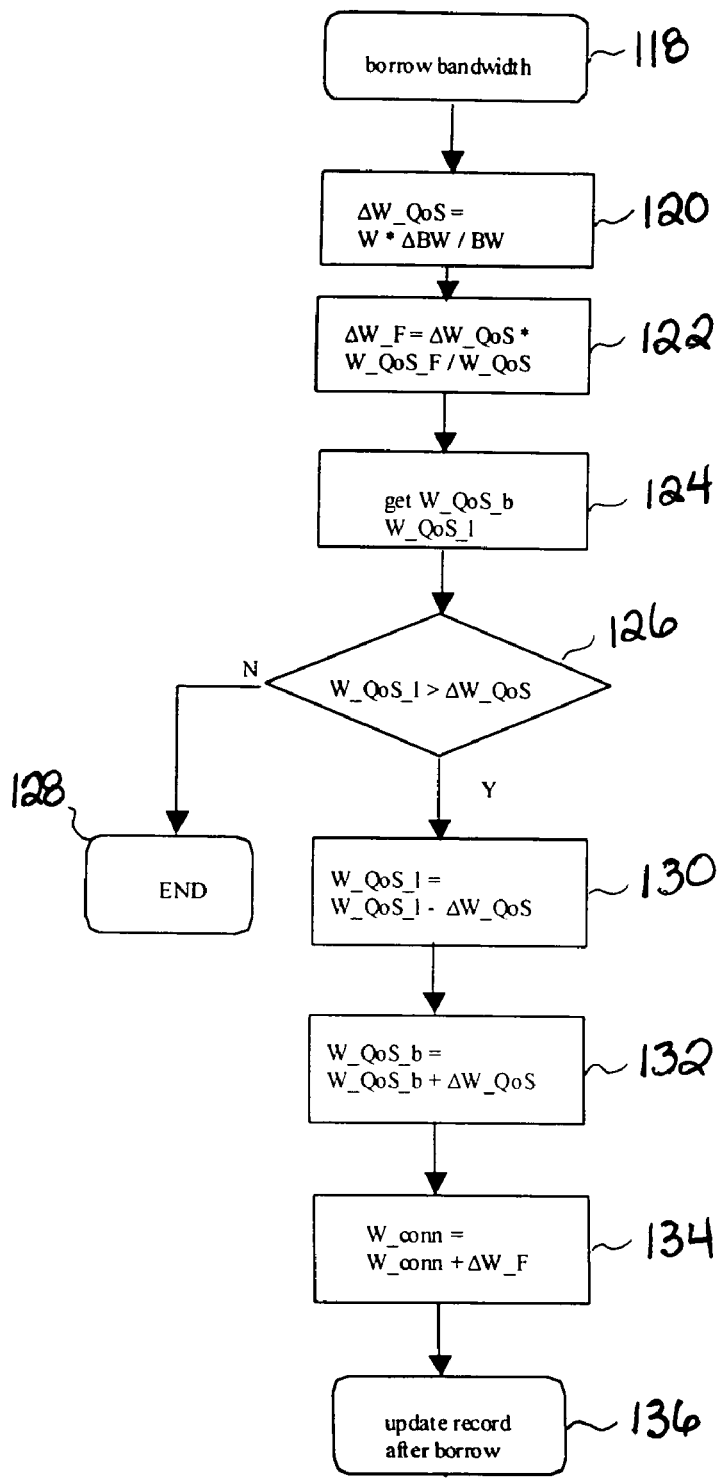
FIG. 5 is a flowchart of an embodiment of a method of borrowing bandwidth according to the teachings of the present invention.

FIG. 5 is a flowchart of an embodiment of a method of borrowing bandwidth 118 according to the teachings of the present invention. The related parameters are read and $\Delta W\_QoS$ 74 and $\Delta W\_F$ 76 are calculated, as shown in blocks 120 and 122. W_QoS is the weight of the class associated with the current connection. W 32 is the total weight of the classes. BW is the bandwidth of the WRR scheduler. W_QoS_F is the total weight of connections in this class. It then compares the weight of the class to lend the bandwidth W_QoS_1 with $\Delta W\_QoS$, as shown in block 126. The class to lend the bandwidth is identified by QoS ID in the AWT entry. If W_QoS_1<$\Delta W\_QoS$, ADBA stops in block 128 since there is insufficient bandwidth to borrow from. This situation can optionally trigger an alarm. Otherwise, the W_QoS_1 is subtracted by $\Delta W\_QoS$ in block 130. The weight of the class that associated with the current connection W_QoS_b is added by $\Delta W\_QoS$ in block 132.

Also, the connection weight W_conn is added by ΔW_F in block 124. The AWD records are then updated in block 136, which is described in more detail in FIG. 7.

Figure 7:
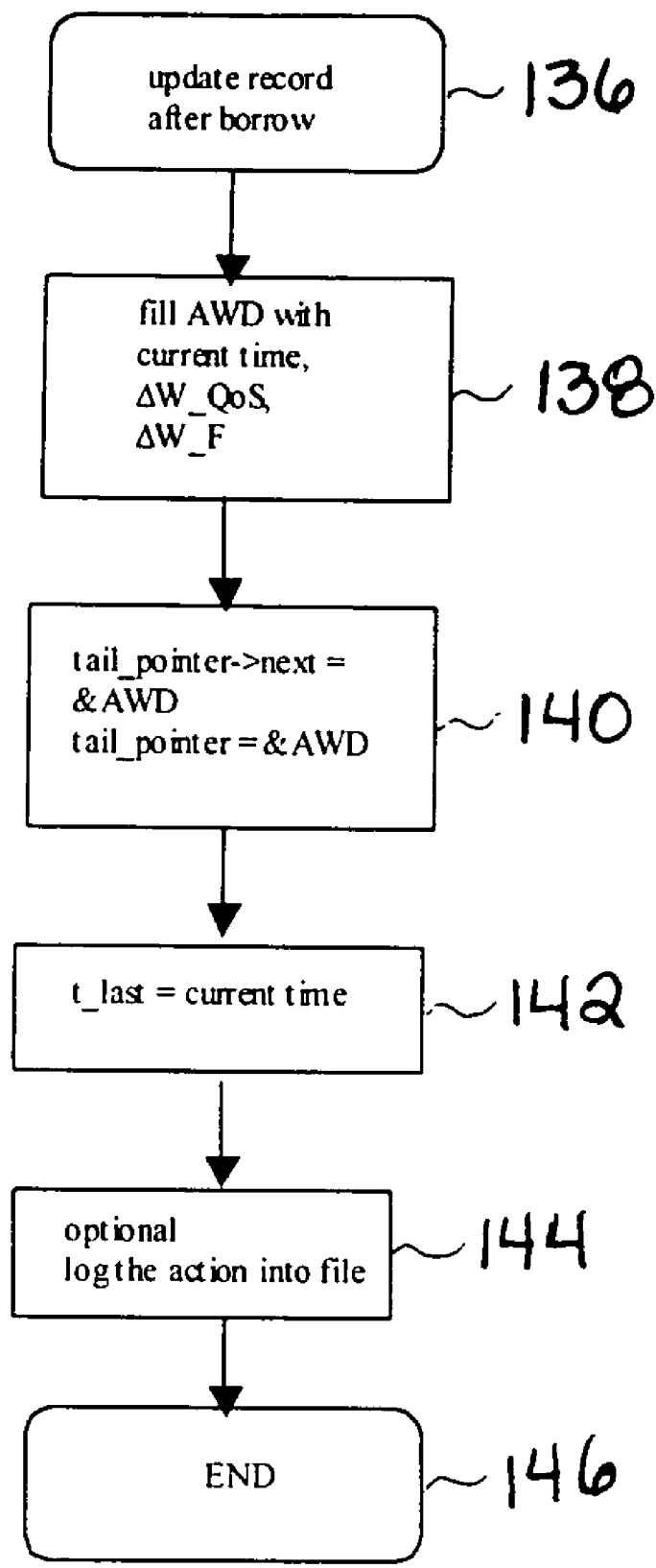
FIG. 7 is a flowchart of an embodiment of a method of updating the data record after borrowing bandwidth according to the teachings of the present invention.

FIG. 7 is a flowchart of an embodiment of a method 136 of updating the data record after borrowing bandwidth according to the teachings of the present invention. A new AWD is allocated and filled with the current time (timestamp), ΔW_QoS and ΔW_F, as shown in block 138. The AWD is then linked to the tail 45 of the link list 42 so that it now is the new tail of the linked list, as shown in block 140. t_last 54 in the corresponding AWT entry 41 is also updated with the current time, as shown in block 142. Optionally, an action log file kept for documentation purposes is updated to add the latest borrow action information, as shown in block 144. The process ends in block 146.

According to the teachings of the present invention, the bandwidth is borrowed from a predefined class, not from specific connections. This approach reduces the impact on individual connections. On the other hand, all borrowed bandwidth is assigned to a particular connection since only this particular connection needs the extra bandwidth.

Figure 6:
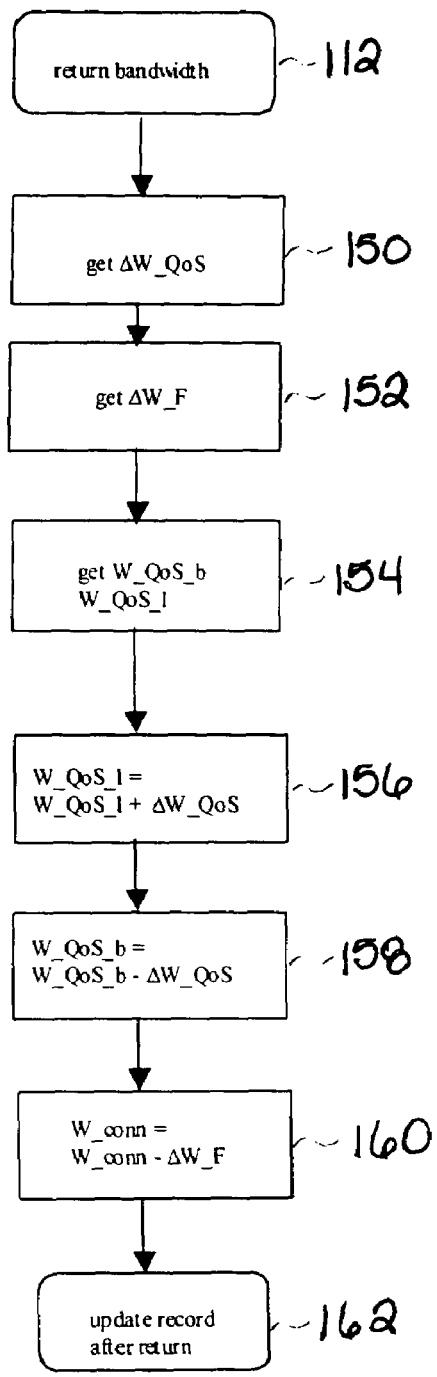
FIG. 6 is a flowchart of an embodiment of a method of returning bandwidth according to the teachings of the present invention.

FIG. 6 is a flowchart of an embodiment of a method 112 of returning bandwidth according to the teachings of the present invention. In blocks 150 and 152, ΔW_QoS 74 and ΔW_F 76 are read from AWD 43 at the head of the link list 42 maintained by the AWT entry 41. The W_QoS_1 identified by QOS_ID 58 in AWT entry 41 is read and increased by ΔW_QoS (blocks 154 and 156). W_QoS_b is then decreased by ΔW_QoS in block 158, and the W_conn is decreased by ΔW_F in block 160. The borrowed bandwidth is thus returned. The AWD record is updated in block 162, which is described in more detail in FIG. 8.

Figure 8:
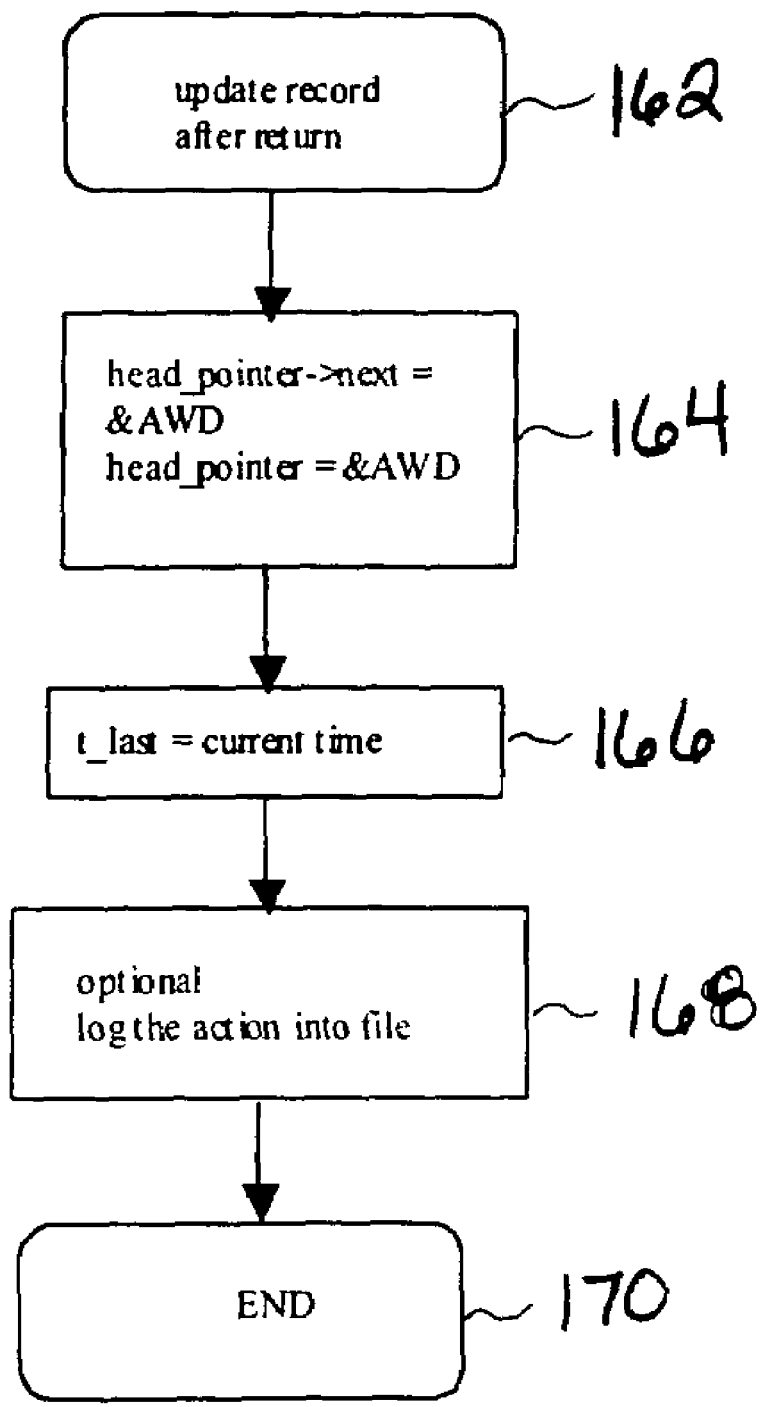
FIG. 8 is a flowchart of an embodiment of a method of updating the data record after returning bandwidth according to the teachings of the present invention.

FIG. 8 is a flowchart of an embodiment of a method 162 of updating the data record after returning bandwidth according to the teachings of the present invention. AWD 43 at the head of linked list 42 is removed from the linked list and deleted, as shown in block 164. The memory allocated to the deleted AWD may be garbage collected and returned to the available memory pool. In block 166, t_last 54 is updated with the current time. In block 168, the action is then logged into the action log file, if this documentation is maintained. The process ends in block 170.

The present invention permits initially assigning weight to a connection that requires delay guarantee only based on its average sending rate. During the lifetime of the connection, it then actively adjusts the weight of the connection to match its dynamic bandwidth requirement. Therefore, an ISP can support more primary connections while obeying the service contracts. For the same performance, the customers are likely to be charged less than with the current conventional technology. This provides a strong competitive advantage to an ISP who adopts this invention.

There are different types of connections in a switch. Some requires very short instantaneous delay, like voice connections and videoconferencing connections. Some others are less sensitive to the instantaneous delay, like telnet. Connections like file transfer protocol (FTP) do not care about the instantaneous delay as long as the average delay over the lifetime of the connection is reasonable. By adjusting the weights, the invention actively borrows bandwidth from delay non-sensitive connections for a delay-critical connection when the connection is going to break its limit. When the delay-critical connection no longer needs the borrowed bandwidth or because of other policies, the borrowed bandwidth is returned.

Allowing the return of bandwidth is important for many reasons. The maximum weight is constrained by hardware, and cannot be increased infinitely. Using the present invention, only urgent delay-critical connections that will exceed the respective delay requirements are allowed to borrow bandwidth. Other connections that meet the respective delay budget can still use their original weight without alterations. Therefore, the same bandwidth can be borrowed by one connection, returned, and then borrowed by another delay-critical connection. By getting borrowed bandwidth back, the lender connections can also have small average delay.

There are two bandwidth return procedures. One is explicit, as described in FIG. 6. Another one is implicit, when the arriving rate of a borrowing connection is below the average rate, the unused bandwidth is automatically returned to other connections, including the lender connections, through the original WRR scheduling. With the original WRR, bandwidth allocation based on the average rate is not sufficient for delay-sensitive connection with variable bandwidth requirement. By introducing the explicit borrowing and explicit returning bandwidth of the invention, the delay requirement can be satisfied while allocating bandwidth according to the average rate. The implicit bandwidth is still necessary even with the explicit bandwidth return. The reason is that lending some bandwidth and getting it back later is not the same as never lending the bandwidth. Actually, the former action results in less data being transmitted by the lender connections. The compensation is done through the implicit bandwidth return. The invention naturally supports multiple classes with different bandwidth borrowing and return policies. The variant QoS requirement can be satisfied at different classes. The conventional WRR with fixed weight does not prioritize the QoS requirement and importance of the different connections, while strict priority goes to the extreme of the priority. Strict priority is risky since there is no control on how much the low priority connections can be starved. The service guarantee can only be committed to the highest priority class, not to the others. On the contrary, the present invention prioritizes the connections and performs the bandwidth assignment in a tightly controlled and very flexible manner.

The connections can be divided into several classes according to their QoS requirement. Classifying a connection into which class is very flexible, depending on the policy configured by the ISP. The eligibility of borrowing and lending is also very flexible, policy dependent, can based on the class or based on per-connection, or even based on which class currently has most bandwidth to lend etc. The maximum amount of bandwidth and how long the bandwidth a connection can borrow without returning are also configurable. For example, a voice connection can be classified as class A, a FTP connection can be classified as class B. Connections in class A can borrow bandwidth from class B, but not vice versa. The configuration may also specify that connections in class A can only borrow bandwidth for one hour without return. Otherwise, it has to return some bandwidth. In addition, the borrowing and returning actions can be logged for billing, traffic analysis, and system planning purposes.

Although the present invention has been described in terms of active dynamic bandwidth assignment by adjusting the weight for WRR scheduling, the same concept is equally applicable to rate scheduling. By adjusting the cell-to-cell spacing, a class A connection can borrow bandwidth from a class B connection.

While the invention has been particularly shown and described by the foregoing detailed description, it will be understood by those skilled in the art that various changes, alterations, modifications, mutations and derivations in form and detail may be made without departing from the spirit and scope of the invention.

What is claimed is:

1. A method of adaptive resource allocation in transmitting data, comprising:
allocating a resource to each of a plurality of data transmitting active connections, the plurality of active connections belonging to more than one class of service;
determining a lender class of service for each active connection from which resources may be reallocated to the active connection;
periodically comparing the resource usage of an active connection to an upper threshold and a lower threshold;
borrowing resources from the lender class of service for the active connection in response to the current usage exceeding the upper threshold;
returning resources to the lender class of service from the active connection in response to the current usage being less than the lower threshold;
recording a time of the last resource reallocation action when resource was borrowed or returned for the active connection; and
comparing a current time with the last resource reallocation action time and proceeding or not proceeding to borrowing in response to the difference therebetween.

2. The method, as set forth in claim 1, wherein periodically comparing the resource usage comprises comparing the resource usage of the active connection in response to receiving incoming data on the active connection.

3. The method, as set forth in claim 1, wherein periodically comparing the resource usage comprises comparing the resource usage of the active connection in response to receiving an incoming cell of data on the active connection.

4. The method, as set forth in claim 1, further comprising:
proceeding to borrow in response to the difference between the current time and the last resource reallocation action time being greater than a predetermined minimum time spacing requirement, and not proceeding to borrow in response to the difference between the current time and the last resource reallocation action time being less than or equal to the predetermined minimum time spacing requirement.

5. The method, as set forth in claim 1, further comprising:
recording a time of an oldest borrow action when resource was borrowed for the active connection;
comparing a current time with the oldest borrow action time; and
proceeding to returning tin response to the difference between the current time and the oldest borrow action time being greater than a predetermined maximum borrow time requirement.

6. The method, as set forth in claim 1, wherein borrowing comprises:
determining available resources of the lender class of service; and
proceed to borrowing if the available resources is sufficient.

7. The method, as set forth in claim 1, further comprising:
storing data associated with each borrow action for each active connection, including:
a borrow action time;
an amount of resource borrowed for the active connection; and
an weight increment for the active connection.

8. The method, as set forth in claim 1, further comprising:
storing data associated with each active connection, including:
a time of last resource reallocation for the active connection;
an enable indicative of whether resource reallocation is permitted for the active connection;
a lender class identifier indicative of the class of service that resources can be borrowed from;
an upper threshold indicative of need to borrow resources; and
a lower threshold indicative of need to return to borrowed resources.

9. The method, as set forth in claim 8, wherein storing data associated with each active connection further comprises:
storing a minimum time spacing between resource reallocation actions; and
storing a maximum time to return borrowed resources.

10. The method, as set forth in claim 7, further comprising storing data associated with each borrow action for each active connection in a linked list, with the oldest borrow action at the head of the linked list.

11. The method, as set forth in claim 10, wherein returning borrowed resources comprises removing an oldest link in the linked list.

12. The method, as set forth in claim 1, further comprising first scheduling resources using a weighted round robin method.

13. The method, as set forth in claim 1, wherein borrowing and returning resources comprise borrowing and returning bandwidths.

14. The method, as set forth in claim 1, wherein borrowing and returning resources comprise increasing and decreasing data sending rate.

15. A method of adaptive dynamic weight assignment for transmitting data, comprising:
assigning a total weight to each class of services;
assigning a weight to each of a plurality of data transmitting active connections in each class of services;
determining a lender class of service for each active connection from which weighting may be reallocated to the active connection;
periodically comparing the resource usage of an active connection to an upper threshold and a lower threshold;
borrowing additional weighting from the lender class of service for the active connection in response to the current usage exceeding the upper threshold;
returning borrowed weighting to the lender class of service from the active connection in response to the current usage being less than the lower threshold; and
storing data associated with each borrow action for each active connection, including:
a borrow action time;
an amount of resource borrowed for the active connection; and
a weight increment for the active connection.

16. The method, as set forth in claim 15, wherein periodically comparing the resource usage comprises comparing the resource usage of the active connection in response to receiving incoming data on the active connection.

17. The method, as set forth in claim 15, wherein periodically comparing the resource usage comprises comparing the resource usage of the active connection in response to receiving an incoming cell of data on the active connection.

18. The method, as set forth in claim 15, further comprising:
  recording a time of the last weighting reallocation action when weighting was borrowed or returned for the active connection;
  comparing a current time with the last weighting reallocation action time and proceeding or not proceeding to borrowing in response to the difference therebetween.

19. The method, as set forth in claim 15, further comprising:
  recording a time of the last weighting reallocation action when weighting was borrowed or returned for the active connection;
  comparing a current time with the last weighting reallocation action time; and
  proceeding to borrowing in response to the difference between the current time and the last weighting reallocation action time being greater than a predetermined minimum time spacing requirement, and not proceeding to borrowing in response to the difference between the current time and the last weighting reallocation action time being less than or equal to the predetermined minimum time spacing requirement.

20. The method, as set forth in claim 15, further comprising:
  recording a time of an oldest borrow action when weighting was borrowed for the active connection;
  comparing a current time with the oldest borrow action time; and
  proceeding to returning in response to the difference between the current time and the oldest borrow action time being greater than a predetermined maximum borrow time requirement.

21. The method, as set forth in claim 15, wherein borrowing comprises:
  determining available weighting of the lender class of service; and
  proceed to borrowing if the available weighting is sufficient.

22. The method, as set forth in claim 15, further comprising:
  storing data associated with each active connection, including:
  a time of last weighting reallocation for the active connection;
  an enable indicative of whether weighting reallocation is permitted for the active connection;
  a lender class identifier indicative of the class of service that weighting can be borrowed from;
  an upper threshold indicative of need to borrow weighting; and
  a lower threshold indicative of need to return borrowed weighting.

23. The method, as set forth in claim 22, wherein storing data associated with each active connection further comprises:
  storing a minimum time spacing between resource allocation actions; and
  storing a maximum time to return borrowed resources.

24. The method, as set forth in claim 15, further comprising storing data associated with each borrow action for each active connection in a linked list, with the oldest borrow action at the head of the linked list.

25. The method, as set forth in claim 15, wherein returning borrowed weighting comprises removing an oldest link in the linked list.

26. The method, as set forth in claim 15, further comprising using a weighted round robin method to schedule bandwidth assignment.

* * * * *